United States Patent
Fukunaga et al.

(10) Patent No.: US 9,506,552 B2
(45) Date of Patent: Nov. 29, 2016

(54) WORK VEHICLE WITH IMPROVED TRANSMISSION HYDRAULICS

(71) Applicant: KUBOTA CORPORATION, Osaka (JP)

(72) Inventors: Tomofumi Fukunaga, Osaka (JP); Keishiro Nishi, Osaka (JP); Akira Hiwatashi, Osaka (JP); Hisao Mukai, Osaka (JP); Koji Matsuda, Osaka (JP); Takuya Tanigawa, Osaka (JP); Takahiro Nakatsuka, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/855,729

(22) Filed: Sep. 16, 2015

(65) Prior Publication Data

US 2016/0091078 A1    Mar. 31, 2016

(30) Foreign Application Priority Data

Sep. 29, 2014 (JP) ................................ 2014-199099

(51) Int. Cl.
*F16H 57/021* (2012.01)
*B60K 17/28* (2006.01)
*F16H 47/02* (2006.01)

(52) U.S. Cl.
CPC ............. *F16H 57/021* (2013.01); *B60K 17/28* (2013.01); *F16H 47/02* (2013.01); *B60Y 2200/221* (2013.01)

(58) Field of Classification Search
CPC ........... F16H 57/0402; F16H 57/0404; F16H 57/021; B60K 17/10; B60K 17/28; B60K 2025/065; B62D 11/18
See application file for complete search history.

(56) References Cited

U.S. PATENT DOCUMENTS

| 4,745,743 | A | * | 5/1988 | Boulanger | B60K 25/06 417/360 |
|---|---|---|---|---|---|
| 5,913,950 | A | * | 6/1999 | Matsufuji | B60K 17/04 74/606 R |
| 2006/0073747 | A1 | * | 4/2006 | Harada | B63H 23/30 440/75 |
| 2008/0173495 | A1 | * | 7/2008 | Komatsu | B60K 17/08 180/344 |
| 2008/0260545 | A1 | * | 10/2008 | Frokjaer | F04B 49/20 417/212 |
| 2012/0023939 | A1 | * | 2/2012 | Kley | F02B 39/04 60/624 |
| 2014/0015315 | A1 | * | 1/2014 | Takahashi | B28C 5/4213 307/10.1 |

FOREIGN PATENT DOCUMENTS

JP    2014-25554    2/2014

* cited by examiner

*Primary Examiner* — Drew Brown
(74) *Attorney, Agent, or Firm* — Greenblum & Bernstein, P.L.C.

(57) ABSTRACT

A work vehicle that includes: a transmission system decreasing or changing a speed of a driving force from an engine and outputting the driving force. A transmission case houses the transmission system. A hydraulic circuit supplies oil collected in the transmission case to hydraulic equipment. The transmission case is divided to form a storage space housing a minimum speed transmission portion of the transmission system. The hydraulic circuit connects a suction intake oil passage of the hydraulic circuit to a bottom portion of the storage space and supplies the oil collected in the storage space to the hydraulic equipment.

11 Claims, 3 Drawing Sheets

WORK VEHICLE WITH IMPROVED TRANSMISSION HYDRAULICS

CROSS-REFERENCE TO RELATED APPLICATIONS

The present application claims priority under 35 U.S.C. §119 of Japanese Application No. 2014-199099, filed on Sep. 29, 2014, the disclosure of which is expressly incorporated by reference herein in its entirety.

BACKGROUND OF THE INVENTION

1. Field of the Invention

The present invention relates to a work vehicle that includes a transmission system decreasing a speed of a driving force from an engine and outputting the driving force; a transmission case housing the transmission system; and a hydraulic circuit supplying oil collected in the transmission case to hydraulic equipment.

2. Description of Related Art

A tractor (exemplary work vehicle) of the above description may be configured such that a transmission case is configured by a midcase and a rear case coupled to a rear end of the midcase; such that the midcase which, of the midcase and the rear case, houses a high-speed transmission portion side of a transmission system, is used as an oil supply source; and oil collected inside the midcase is supplied to hydraulic equipment such as a power steering device or a hydrostatic continuously variable transmission (see, e.g., Japanese Patent Laid-open Publication No. 2014-25554, paragraph numbers 0014 and 0022 to 0024, and FIGS. 2 and 5).

According to this configuration, the oil in the midcase, in which bubbles are likely to form due to agitation of the oil by a transmission gear or the like because the high-speed transmission portion side of the transmission system is housed therein, is supplied to hydraulic equipment such as the power steering device or the hydrostatic continuously variable transmission. Therefore, there is room for improvement to inhibit malfunctions, noise, and the like in the various kinds of hydraulic equipment due to air entrainment.

SUMMARY OF THE INVENTION

The present invention effectively inhibits malfunctions, noise, and the like in hydraulic equipment due to air entrainment.

An aspect of the present invention is a work vehicle that includes: a transmission system decreasing a speed of a driving force from an engine and outputting the driving force; a transmission case housing the transmission system; and a hydraulic circuit supplying oil collected in the transmission case to hydraulic equipment. The transmission case is divided to form a storage space housing a minimum speed transmission portion of the transmission system. The hydraulic circuit connects a suction intake oil passage of the hydraulic circuit to a bottom portion of the storage space and supplies the oil collected in the storage space to the hydraulic equipment.

According to this aspect, by housing the minimum speed transmission portion of the transmission system in the storage space, the oil collected in the storage space, which is unlikely to have been agitated by a transmission gear or the like and which is unlikely to have formed bubbles, is supplied to the hydraulic equipment.

As a result, malfunctions, noise, and the like in the hydraulic equipment due to air entrainment can be effectively inhibited.

Another aspect of the present invention is the work vehicle in which the storage space is divided by a bearing holder supporting the transmission system, and having a through-hole formed in the bearing holder as a suction intake opening of the suction intake oil passage.

According to this aspect, no interior oil passage is formed in a case portion forming the storage space in the transmission case; instead, the through-hole is formed in the bearing holder, enabling extraction of the oil from the storage space. Therefore, the configuration required to form the suction intake oil passage (suction intake opening) can be simplified as compared to a case where an interior oil passage is formed in the case portion forming the storage space.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment applying the present invention to a tractor, as an example of a work vehicle, is described with reference to the drawings as an exemplary embodiment of the present invention.

Figure 1:
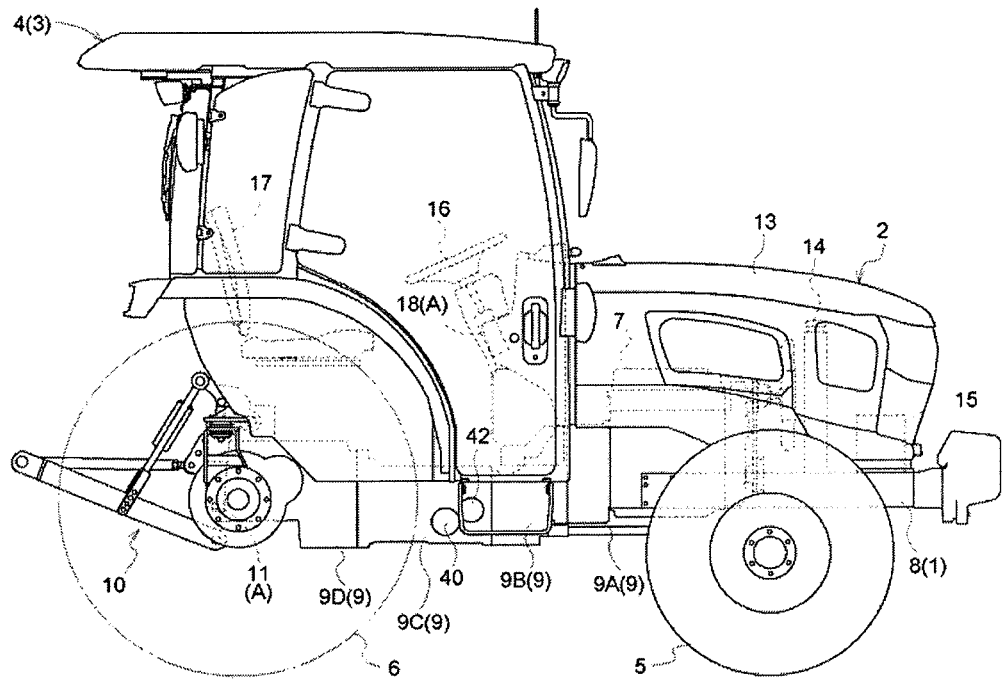
FIG. 1 is a right side view of a tractor.

As shown in FIG. 1, an exemplary tractor in the present embodiment includes a motor portion 2 in a front half of a vehicle body frame 1. In addition, a cabin 4 forming a cockpit 3 is mounted so as to be isolated from vibration in a rear half of the vehicle body frame 1. Furthermore, left and right front wheels 5 capable of being driven and steered are provided to locations on both left and right sides of a front portion of the vehicle body frame 1. In addition, left and right rear wheels 6 capable of being driven and braked are provided to locations on both left and right sides of a rear portion of the vehicle body frame 1. Accordingly, a four-wheel drive format that includes the drivable left and right front wheels 5 and left and right rear wheels 6 is achieved.

Figure 2:
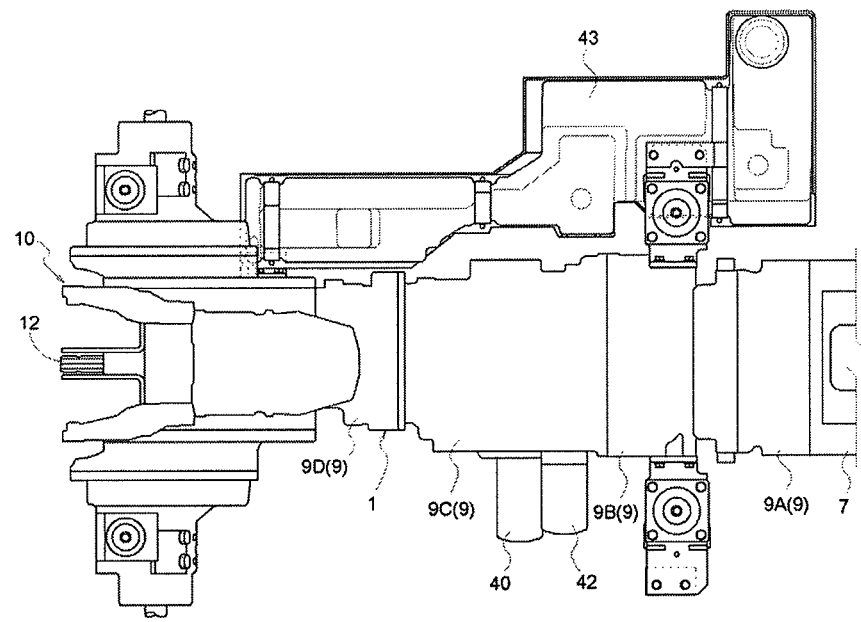
FIG. 2 is a lateral section plan view of relevant portions showing a positional relationship between a main filter, an HST filter, and a fuel tank.
Figure 3:
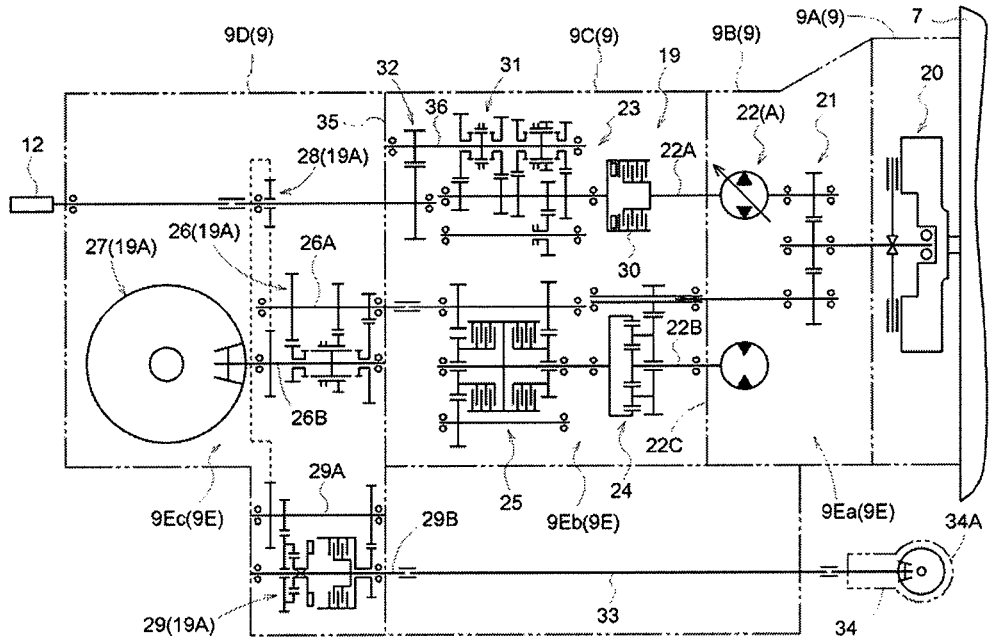
FIG. 3 is a right side, vertical cross-section view of relevant portions showing a configuration of a transmission case and transmission system.

As shown in FIGS. 1 to 3, the vehicle body frame 1 is configured by bolting together an engine 7; a front frame 8 extending forward from below the engine 7; and a frame member/transmission case 9 extending rearward from below a rear end of the engine 7. In other words, the front half of the vehicle body frame 1 is configured by the engine 7 and the front frame 8, while the rear half of the vehicle body frame 1 is configured by the transmission case 9. In addition, mounted to a rear portion of the transmission case 9 are, for example, a link mechanism 10 enabling the coupling or mounting of a work apparatus (not shown in the drawings) such as a rotary tiller or a plow; a hydraulic elevating mechanism 11 enabling lifting and lowering operation of the work apparatus via the link mechanism 10. A PTO shaft 12 enabling transfer of work power to the work apparatus in a case where a drive-type work apparatus such as the rotary tiller is coupled and mounted to the rear portion of the vehicle body frame 1.

As shown in FIG. 1, the motor portion 2 is configured by providing the engine 7, a radiator 14, a battery 15, and the like in an engine compartment, which is formed by the front frame 8, a hood 13, and the like.

A cockpit 3 includes a steering wheel 16 for front wheel steering, a driver's seat 17, and the like. The steering wheel 16 is linked to the left and right front wheels 5 via a total hydraulic power steering unit (hereafter referred to as a PS unit) 18 or the like.

As shown in FIGS. 1 to 4, the transmission case 9 is configured by a four-part structure in which a first case 9A, a second case 9B, a third case 9C, and a fourth case 9D are bolted together in that order in a front-back direction. In addition, a front end of the first case 9A is bolted to a lower portion of the rear end of the engine 7, thereby connecting the transmission case 9 to the lower portion of the rear end of the engine 7.

As shown in FIG. 3, a transmission system 19 is provided on an interior of the transmission case 9, with the transmission system 19 decreasing a speed of the driving force from the engine 7 and outputting the driving force. The transmission system 19 includes, for example, a main clutch 20 enabling interruption of the drive transmission from the engine 7; a gear-type driving force distribution mechanism 21 splitting the driving force that passes through the main clutch 20 into a first driving force and a second driving force; a hydrostatic continuously variable transmission (hereafter referred to as an HST) 22 speed-changing the first driving force from the driving force distribution mechanism 21; a work transmission system 23 transmitting the driving force obtained from an input shaft 22A of the HST 22 to the PTO shaft 12 as work power; a planetary gear-type transmission mechanism 24 compounding the driving force from an output shaft 22B of the HST 22 and the second driving force from the driving force distribution mechanism 21; a forward/reverse travel switching mechanism 25 switching the driving force from the transmission mechanism 24 between that used for forward travel and that used for reverse travel; a gear-type speed change mechanism 26 speed-changing the driving force from the forward/reverse travel switching mechanism 25 into three speeds; a rear wheel differential mechanism 27 distributing the driving force from the speed change mechanism 26 to the left and right as a rear wheel drive force; left and right rear wheel drive shafts (not shown in the drawings) outputting the driving force from the rear wheel differential mechanism 27 to the left and right rear wheels 6; a gear unit 28 obtaining front wheel drive force from an output shaft 26B of the speed change mechanism 26; and a front wheel speed change mechanism 29 speed-changing the driving force from the gear unit 28.

The work apparatus transmission system 23 includes, for example, a PTO clutch 30 enabling interruption of the drive transmission to the PTO shaft 12; a PTO speed change mechanism 31 speed-changing the driving force that passes through the PTO clutch 30 into four speeds; a gear-type deceleration mechanism 32 reducing the speed of the driving force received from the PTO speed change mechanism 31; and the PTO shaft 12 outputting the driving force from the deceleration mechanism 32 to the work apparatus as work power.

A front wheel speed change mechanism 29 is configured such that the front wheel drive force from the output shaft 29B is transmitted to the left and right front wheels 5 via, for example, an external transmission shaft 33 oriented in the front-back direction, the front wheel differential mechanism 34A installed in a front axle case 34, and left and right front wheel drive shafts (not shown in the drawings).

In other words, the transmission system 19 is configured so as to correctly distribute and decrease the speed of the driving force from the engine 7 between front wheel drive, rear wheel drive, and work power; output the front wheel driving force to an exterior of the transmission case 9 using the output shaft 29B of the front wheel speed change mechanism 29; output the rear wheel driving force to the exterior of the transmission case 9 using the left and right rear wheel drive shafts; and output the work driving force to the exterior of the transmission case 9 using the PTO shaft 12.

Figure 4:
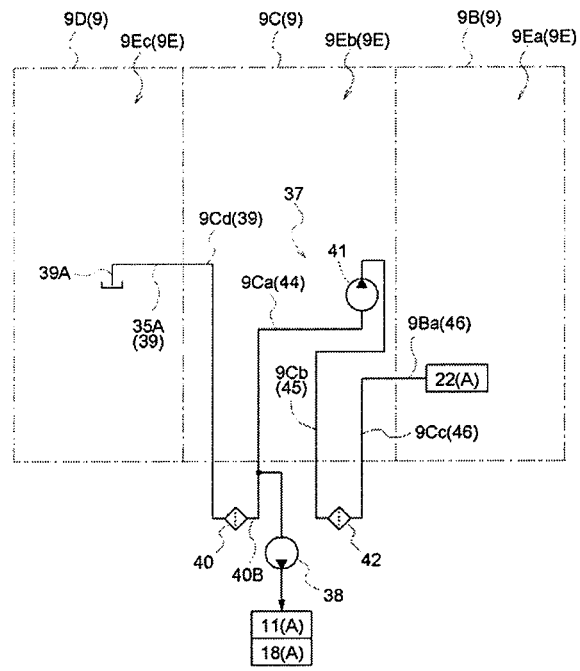
FIG. 4 is a schematic diagram of a hydraulic circuit.

As shown in FIGS. 3 and 4, the transmission case 9 housing the transmission system 19 provides a port block 22C of the HST 22 at a boundary location between the second case 9B and the third case 9C in an interior space 9E. In addition, a bearing holder 35 supporting the transmission system 19 is provided at a boundary location between the third case 9C and the fourth case 9D. Accordingly, the interior space 9E of the transmission case 9 is divided into a first storage space 9Ea positioned forward of the port block 22C; a second storage space 9Eb positioned between the port block 22C and the bearing holder 35; and a third storage space 9Ec positioned rearward of the bearing holder 35. The main clutch 20, the driving force distribution mechanism 21, and the HST 22 are housed in the first storage space 9Ea. The transmission mechanism 24, the forward/reverse travel switching mechanism 25, the PTO clutch 30, the PTO speed change mechanism 31, and the deceleration mechanism 32 are housed in the second storage space 9Eb. The speed change mechanism 26, the rear wheel differential mechanism 27, the gear unit 28, and the front wheel speed change mechanism 29 are housed in the third storage space 9Ec.

In other words, the third storage space 9Ec is defined by the fourth case 9D and the bearing holder 35, with the third storage space 9Ec housing the speed change mechanism 26, the rear wheel differential mechanism 27, the gear unit 28, and the front wheel speed change mechanism 29, which configure the minimum speed transmission portion 19A of the transmission system 19.

As shown in FIG. 3, the bearing holder 35 supports, via at least one bearing, each of the input shaft 26A and output shaft 26B of the speed change mechanism 26; the input shaft 29A and the output shaft 29B of the front wheel speed change mechanism 29; and the transmission shaft 36, which serves as both the output shaft of the PTO speed change mechanism 31 and the input shaft of the deceleration mechanism 32.

As shown in FIG. 4, the tractor includes a hydraulic circuit 37 supplying oil that has collected in the transmission case 9 to various kinds of hydraulic equipment A, such as the elevating mechanism 11, the PS unit 18, and the HST 22. Using the action of a hydraulic pump 38, the hydraulic circuit 37 is configured so as to filter, using a main filter 40, the oil sucked up through a suction intake opening 39A of a suction intake oil passage 39 and supply the filtered oil to the elevating mechanism 11 and the PS unit 18, for example. In addition, using the action of a charge pump 41, the oil filtered by the main filter 40 is further filtered by an HST filter 42, and the further filtered oil is supplied to a circulation oil passage (not shown in the drawings) of the HST 22.

As shown in FIGS. 1 and 2, in the tractor, a location on a left side of the transmission case 9 is defined as an arrangement space of a fuel tank 43. In order to ensure a large arrangement space for the fuel tank 43, the main filter 40 and HST filter 42, which are conventionally split up and arranged one on a left side and one on a right side of the transmission case 9, are centralized and arranged on a right side of the third case 9C of the transmission case 9. Accordingly, the fuel tank 43 can be enlarged and a capacity of the fuel tank 43 can be increased.

Figure 5:
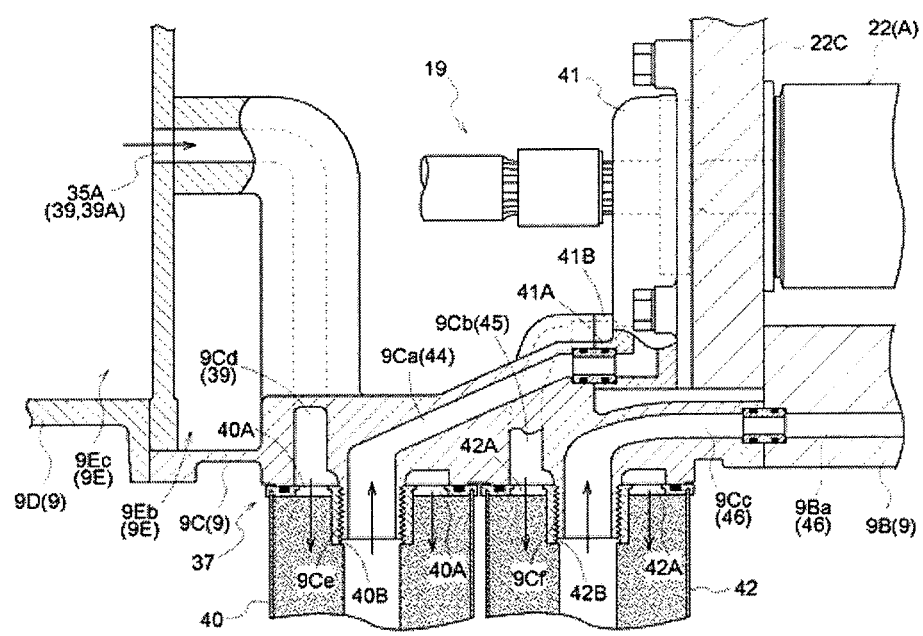
FIG. 5 is a lateral section plan view of relevant portions showing a configuration of oil passages and an attachment structure of the main filter and HST filter.

As shown in FIGS. 4 and 5, a first charge oil passage 44, which runs from an oil outflow portion 40B of the main filter 40 to a suction intake portion 41A of the charge pump 41, and a second charge oil passage 45, which runs from an ejection portion 41B of the charge pump 41 to an oil inflow portion 42A of the HST filter 42, are configured by interior oil passages 9Ca and 9Cb, which are formed by a cast or machined hole in the third case 9C of the transmission case 9. In addition, a third charge oil passage 46 running from an oil outflow portion 42B of the HST filter 42 to the port block 22C of the HST 22 is configured by an interior oil passage 9Cc formed by a cast or machined hole in the third case 9C of the transmission case 9 and an interior oil passage 9Ba formed by a cast or machined hole in the second case 9B of the transmission case 9. Also, the suction intake oil passage 39 running from the oil inflow portion 40A of the main filter 40 to the interior space 9E of the transmission case 9 is configured by an interior oil passage 9Cd formed by a cast or machined hole in the third case 9C and a through-hole 35A formed by a cast or machined hole in a left-right direction center of a bottom portion of the bearing holder 35. The through-hole 35A is configured as the suction intake opening 39A of the suction intake oil passage 39 connected to a left-right direction center location on the bottom portion of the third storage space 9Ec.

In other words, in the hydraulic circuit 37, the oil passages 39 and 44 to 46, running from the interior space 9E of the transmission case 9 to the port block 22C of the HST 22, are formed entirely in the interior of the transmission case 9. Accordingly, the configuration can be simplified due to reducing the number of components and costs can be reduced as compared to a case where an external pipe is provided which forms all or a portion of the oil passages 39 and 44 to 46.

Furthermore, in the hydraulic circuit 37, by housing the minimum speed transmission portion 19A of the transmission system 19, the oil collected in the third storage space 9Ec is unlikely to be agitated by the transmission gear or the like and bubbles are unlikely to form. The collected oil is extracted from the left-right direction center location on the bottom portion of the third storage space 9Ec and is supplied to the various kinds of hydraulic equipment A, such as the elevating mechanism 11, the PS unit 18, and the HST 22. As a result, malfunctions, noise, and the like in the various kinds of hydraulic equipment A due to air entrainment can be effectively inhibited. In addition, a reduction in the amount of oil supplied to the various kinds of hydraulic equipment A due to the oil collecting on one side accompanying tilting of the vehicle to the left or right can be effectively inhibited.

Moreover, no interior oil passage is formed in the fourth case 9D; instead, the through-hole 35A is formed in the bearing holder or wall 35, enabling extraction of the oil from the third storage space 9Ec. Therefore, the configuration required to form the suction intake oil passage 39 (suction intake opening 39A) can be simplified as compared to a case where an interior oil passage is formed in the fourth case 9D. The As shown in FIG. 5, the third case 9C of the transmission case 9 includes a first threaded portion 9Ce for mounting the main filter 40, the first threaded portion 9Ce being provided to a location on the right side of the third case 9C where the first charge oil passage is formed. In addition, a second threaded portion 9Cf for mounting the HST filter 42 is provided to a location on the right side of the third case 9C where the third charge oil passage is formed. The main filter 40 is formed such that the oil outflow portion 40B is capable of threading together with the first threaded portion 9Ce of the third case 9C. The HST filter 42 is formed such that the oil outflow portion 42B is capable of threading together with the second threaded portion 9Cf of the third case 9C.

In other words, the main filter 40 and the HST filter 42 are configured so as to be directly mounted to the right side of the third case 9C of the transmission case 9.

Other Embodiments (1) Various modifications can be made to the configuration of the transmission system 19. For example, the planetary gear-style transmission mechanism 24 may be omitted. In addition, a gear-type speed change mechanism, a belt-type continuously variable transmission, or the like may be provided instead of the hydrostatic continuously variable transmission 22.

(2) Various modifications can be made to the configuration of the transmission case 9. For example, the transmission case 9 may be divided into a two-part structure or a three-part structure.

(3) A hydraulic rolling mechanism performing rolling drive of the work apparatus, for example, or a hydraulic drive front loader or the like may be provided as the hydraulic equipment A.

(4) Various modifications can be made to the configuration of the hydraulic circuit 37 in accordance with the type of hydraulic equipment A to be mounted, for example.

(5) Various modifications can be made to the configuration of the minimum speed transmission portion 19A in accordance with the configuration of the transmission system 19 or the like. For example, the minimum speed transmission portion 19A housed in the oil extraction storage space 9Ec may be configured by only the rear wheel differential mechanism 27.

(6) The storage space 9Ec housing the minimum speed transmission portion 19A of the transmission system 19 may also be divided by, for example, a dedicated partition wall that does not support the transmission system 19.

(7) The suction intake oil passage 39 of the hydraulic circuit 37 may also be configured so as to be connected to one left-right direction end of the bottom portion of the storage space 9Ec where the minimum speed transmission portion 19A of the transmission system 19 is stored.

The present invention can be applied to a work vehicle such as a tractor, a mower, or a multipurpose work vehicle that includes a transmission system decreasing a speed of a driving force from an engine and outputting the driving force; a transmission case housing the transmission system; and a hydraulic circuit supplying oil collected in the transmission case to hydraulic equipment.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle comprising:
   a transmission system decreasing or changing a speed of a driving force from an engine and outputting the driving force;
   a transmission case housing the transmission system;
   a hydraulic circuit supplying oil collected in the transmission case to hydraulic equipment;
   a storage space housing a minimum speed transmission portion of the transmission system being defined at least by a dividing wall of the transmission case, and
   a suction intake oil passage of the hydraulic circuit being located at a bottom portion of the storage space,
   wherein the dividing wall comprises at least one bearing holder.

2. The work vehicle according to claim 1, wherein the at least one bearing holder is for a shaft that passes through the dividing wall.

3. The work vehicle according to claim 1, wherein the at least one bearing holder is for a rotating shaft.

4. The work vehicle according to claim 1, wherein the suction intake oil passage is coupled to the dividing wall.

5. The work vehicle according to claim 1, wherein the suction intake oil passage extends from one side of the dividing wall to an opposite side of the dividing wall.

6. The work vehicle according to claim 1, wherein the suction intake oil passage is generally centrally arranged with respect to left and right sides of the transmission case.

7. A work vehicle comprising:
   a transmission case housing the transmission system;
   a hydraulic circuit supplying oil collected in the transmission case to hydraulic equipment mounted to the work vehicle and located outside the transmission case;
   a storage space housing transmission gears that supply power to each of:
     rear wheels;
     front wheels; and
     a PTO shaft;
   the storage space being defined at least by:
     a dividing wall arranged inside the transmission case; and
     a wall of the transmission case to which is mounted the PTO shaft;
   a suction intake oil passage of the hydraulic circuit being located at a bottom portion of the storage space and being configured to suction oil located in the storage space; and
   a conduit having one end extending to the suction intake oil passage and conveying the suctioned oil to at least one filter.

8. The work vehicle according to claim 7, wherein the suctioned oil passes from the suction intake oil passage to the at least one filter without contacting oil located in an oil storage space housing the conduit.

9. A work vehicle comprising:
   a transmission case;
   a hydraulic circuit supplying oil collected in the transmission case to at least one hydraulic device located outside the transmission case and mounted to the work vehicle;
   a storage space located in a rear portion of the transmission case and being defined at least by a dividing wall arranged inside the transmission case, and
   a suction intake oil passage of the hydraulic circuit being located at a bottom portion of the storage space and being configured to suction oil located in the storage space; and
   a conduit integrally formed with the transmission case and being configured to convey suctioned oil to at least one filter mounting portion of the transmission case.

10. The work vehicle according to claim 9, further comprising an oil storage space disposed on a side of the dividing wall opposite the storage space.

11. The work vehicle according to claim 10, wherein the suctioned oil passes from the suction intake oil passage to at least one filter mounted to the at least one filter mounting portion without contacting oil located in the oil storage space.

* * * * *